US012601182B2

(12) United States Patent
O'Brien

(10) Patent No.: US 12,601,182 B2
(45) Date of Patent: Apr. 14, 2026

(54) DECORATIVE QUOIN INSTALLATION AND ILLUMINATION SYSTEM AND METHOD

(71) Applicant: John Patrick O'Brien, Woodland Hills, CA (US)

(72) Inventor: John Patrick O'Brien, Woodland Hills, CA (US)

( * ) Notice: Subject to any disclaimer, the term of this patent is extended or adjusted under 35 U.S.C. 154(b) by 619 days.

(21) Appl. No.: 18/095,226

(22) Filed: Jan. 10, 2023

(65) Prior Publication Data

US 2023/0220677 A1 Jul. 13, 2023

Related U.S. Application Data

(60) Provisional application No. 63/358,753, filed on Jul. 6, 2022, provisional application No. 63/297,983, filed on Jan. 10, 2022.

(51) Int. Cl.

| | |
|---|---|
| ***E04F 13/07*** | (2006.01) |
| ***E04F 13/073*** | (2006.01) |
| ***E04F 13/08*** | (2006.01) |
| ***E04F 19/02*** | (2006.01) |
| ***F21S 8/00*** | (2006.01) |
| *F21Y 115/10* | (2016.01) |

(52) U.S. Cl.

CPC ...... *E04F 13/0733* (2013.01); *E04F 13/0848* (2013.01); *E04F 13/0873* (2013.01); *E04F 19/024* (2013.01); *F21S 8/033* (2013.01); *F21Y 2115/10* (2016.08)

(58) Field of Classification Search

CPC . E04F 13/073; E04F 13/0733; E04F 13/0736; E04F 13/0848; E04F 13/0862; E04F 13/0873; E04F 13/0864; E04F 13/185; E04F 13/147; E04F 19/022; E04F 19/024; E04F 19/028; E04F 19/061; E04F 2290/026

USPC ...................... 52/287.1, 288.1, 276, 278, 314

See application file for complete search history.

(56) References Cited

U.S. PATENT DOCUMENTS

| | | | | |
|---|---|---|---|---|
| 2,113,303 | A * | 4/1938 | Kiefer | E04F 13/147 52/554 |
| 2,255,736 | A | 9/1941 | Odell | |
| 2,360,052 | A * | 10/1944 | Fuller | E04F 19/024 52/276 |
| 2,373,789 | A | 4/1945 | Smith | |
| 3,651,610 | A * | 3/1972 | Donahue | E04F 13/0864 52/278 |
| 3,717,968 | A * | 2/1973 | Olsen | E04F 19/028 52/718.05 |

(Continued)

FOREIGN PATENT DOCUMENTS

| | | | | |
|---|---|---|---|---|
| CN | 1205992 | A * | 1/1999 | C04B 18/026 |
| EP | 0943750 | A2 * | 9/1999 | E04F 15/02 |

(Continued)

*Primary Examiner* — Ryan D Kwiecinski

(74) *Attorney, Agent, or Firm* — KELLY & KELLEY, PLLC

(57) ABSTRACT

A prefabricated decorative quoin system includes an elongated edge column attachable to an existing wall corner. The elongated edge column may be formed by a plurality of elongated edge members interconnected end-to-end. A plurality of prefabricated quoin panels are attached to the edge column in vertical stacked relation. A lighting array disposed relative to an inner surface of the quoin panels may be used to illuminate the quoin panels.

25 Claims, 17 Drawing Sheets

(56) References Cited

U.S. PATENT DOCUMENTS 4,015,391 A * 4/1977 Epstein ............... E04F 13/0864 52/542
4,592,187 A * 6/1986 Crites ................ E04F 13/0733 52/261
5,029,424 A 7/1991 Hingos
5,233,804 A * 8/1993 Miller .................. E04F 19/028 52/288.1
5,297,011 A * 3/1994 Triunfol ............. F21V 33/0076 362/147
5,347,784 A 9/1994 Crick et al.
5,664,376 A 9/1997 Wilson et al.
5,740,642 A * 4/1998 Koenig, Jr. .......... E04F 19/028 403/402
5,813,179 A * 9/1998 Koenig, Jr. .......... E04F 19/028 52/287.1
5,836,123 A * 11/1998 Gulino ................... E04F 13/18 52/591.4
6,219,980 B1 4/2001 Peck, Jr.
6,354,049 B1 * 3/2002 Bennett ................ E04F 19/028 52/287.1
6,405,503 B1 6/2002 Reed
6,625,950 B1 * 9/2003 Shreiner ............ E04F 11/1804 52/718.01
6,631,600 B2 10/2003 Schiedegger et al.
6,883,282 B1 4/2005 Newhart, III
7,793,474 B2 9/2010 Tyler et al.
7,861,476 B2 1/2011 Bezubic, Jr.
8,607,516 B2 12/2013 O'Brien
8,661,751 B1 * 3/2014 Lawrie ................. E04F 19/064 52/287.1
8,726,591 B1 * 5/2014 Steffes ................. E04F 13/073 52/287.1
8,733,043 B1 * 5/2014 Cashman ............. E04F 19/064 52/287.1
8,898,977 B2 * 12/2014 Gulino ............... E04F 13/0894 52/287.1
2002/0092256 A1 * 7/2002 Hendrickson ....... E04F 13/0864 52/554
2002/0121057 A1 * 9/2002 Steffes ................... E04F 13/18 52/287.1
2002/0189181 A1 * 12/2002 Kreitz .................. E04F 19/028 52/288.1
2003/0145553 A1 * 8/2003 Schiedegger .......... E04F 13/18 52/658
2003/0226327 A1 * 12/2003 Perry ................. E04F 13/0864 52/287.1
2004/0093823 A1 * 5/2004 Schiedegger ......... E04F 19/024 52/658
2004/0118062 A1 6/2004 Meijer et al.
2005/0262784 A1 * 12/2005 Justice ................ E04F 13/0864 52/287.1
2006/0059830 A1 * 3/2006 Perry ........................ E04D 1/30 52/518
2006/0070329 A1 * 4/2006 Schiltz .................... E04F 19/06 52/506.01
2006/0256550 A1 * 11/2006 Schultz ................. E04F 19/026 362/147
2007/0137127 A1 * 6/2007 Lincoln ................. B44C 5/0453 52/384
2007/0193147 A1 8/2007 Dugger
2008/0184645 A1 * 8/2008 Trabue ................ E04F 13/0864 52/525
2009/0062413 A1 * 3/2009 Adur ....................... C04B 26/02 521/157
2009/0100795 A1 * 4/2009 Takeshima .......... E04F 13/0736 52/834
2009/0235596 A1 * 9/2009 Tyler ..................... E04F 19/024 52/287.1
2010/0011690 A1 * 1/2010 Schwarz ............... E04F 13/185 52/314
2010/0242387 A1 9/2010 Cashman
2011/0094174 A1 4/2011 Meahl
2011/0185662 A1 8/2011 Mollinger et al.
2011/0185670 A1 8/2011 Mitchell et al.
2011/0289874 A1 * 12/2011 O'Brien .............. E04F 13/0733 52/287.1
2011/0315298 A1 12/2011 Bennett et al.
2013/0279160 A1 * 10/2013 Myers ................... F21V 19/001 29/825
2014/0260020 A1 * 9/2014 Gulino ................ E04F 13/0733 52/287.1
2015/0204078 A1 * 7/2015 Wade .................. E04F 13/0733 52/287.1
2017/0234523 A1 * 8/2017 Krijn ................... E04F 19/0436 362/145
2017/0248302 A1 * 8/2017 Reithler .................. F21S 8/022
2018/0328051 A1 * 11/2018 Singh .................... E04F 19/066
2024/0068631 A1 * 2/2024 Bruder .................. E04B 2/7448

FOREIGN PATENT DOCUMENTS

EP 3447227 A1 * 2/2019 ............... E06B 5/10
EP 4455553 A1 * 10/2024 ............. E06B 1/702
KR 20100003749 A * 1/2010 ............ F21V 33/006
KR 102097557 B1 * 4/2020 ............ E01F 15/141
WO WO-9415042 A1 * 7/1994 ............ E04F 13/185
WO WO-0032885 A1 * 6/2000 ............ E04F 19/026

* cited by examiner

DECORATIVE QUOIN INSTALLATION AND ILLUMINATION SYSTEM AND METHOD

RELATED APPLICATIONS

This application claims the benefit of U.S. Provisional Application No. 63/297,983, filed on Jan. 10, 2022. This application also claims the benefit of U.S. Provisional Application No. 63/358,753, filed on Jul. 6, 2022.

FIELD OF THE INVENTION

The present invention generally relates to quoins. More particularly, the present invention relates to a system and method of installing prefabricated decorative quoins to existing corners and walls as well as to a system and method for illuminating the quoins.

BACKGROUND OF THE INVENTION

Quoins are the cornerstones of brick, stone walls, or stucco buildings. Quoins may be either structural or decorative. Architects and builders use quoins to give the impression of strength and firmness to the outline of a building. Rough-finished or rusticated masonry is also frequently used for foundation layers of buildings to give the same impression. Quoining can be carried out in stone on a stone building, with stone on a predominantly brick building, or by laying brick masonry to give the appearance of blocks at the corner.

Structural quoins can be part of load-bearing walls. However, if the quoins are decorative, they may be made of a variety of materials including brick, stone, concrete, foam and wood. The most common form of decorative use for a quoin is the use of an alternative pattern of rectangles that wrap around the wall, mimicking the pattern of stone blocks or brick as they would wrap around a corner and thus join the two walls. In Georgian architecture, wooden quoins were most often part of an overall theme to imply stone, and thus permanence.

Historically these architectural quoins were just seen on the finest homes and buildings of the time. Quoins typically involved masonry skills during the time of the home's/building's construction. For these reasons, adding quoins to one's property to enhance its curb appeal has not been within reach of the typical do-it-yourselfer.

U.S. Pat. No. 8,607,516 B2 discloses a quoin construction installation system and method. While the system and method disclosed in this patent taught of prefabricated quoins that were easily installed and provided a decorative and aesthetic appeal to the building, there are several drawbacks of this system and method. This patent discloses the use of an elongated true edge attachment which required cutting to a desired length representing the height of the stacked quoins in relation to the existing wall corner. This resulted in material and financial waste. Moreover, the system and method taught by this patent requires the use of tools. Furthermore, the system and method disclosed in this patent were not maintenance free and were susceptible to changes due to weather, such as expansion and contraction of the system relative to the existing wall.

Accordingly, there is a need for prefabricated quoins that are easily installed. There is also a need for a decorative quoin installation system which requires minimum use of tools, minimum to no maintenance, and takes into consideration changes in weather and temperature. There is also a need for quoins which provide additional aesthetic appeal to the building, such as being selectively illuminated. The present invention fulfills these needs and provides other related advantages.

SUMMARY OF THE INVENTION

The present invention resides in a prefabricated, decorative quoin installation system. The installation system of the present invention is toolless or nearly toolless, is easily installed, and easily maintained and accommodates for changes in the weather, such as expansion and contraction due to changes in temperature and the like. The present invention provides aesthetic appeal to an existing wall corner of a building. The present invention may also provide an aesthetic appeal by being selectively illuminated.

The prefabricated decorative quoin installation system generally comprises a plurality of elongated edge members, each of a preset length. The plurality of edge members have a total combined length corresponding to a length of an existing wall corner. Edge connecting members are disposed between adjacent ends of edge members to interconnect the plurality of edge members to form an edge column attachable to the existing wall corner. A plurality of prefabricated quoin panels are attached to the edge column in vertical stacked or horizontal row relation. Spacer panels may be disposed between adjacent quoin panels. Preferably, the plurality of edge members are comprised of a weather resistant material or coating.

Each edge connecting member comprises a first set of projections extending into channels of an edge member disposed above the edge connecting member, and a second set of projections extending into channels of an edge member disposed below the edge connecting member.

A bottom end cap is disposed at the bottom end of the edge column in stacked quoin panels. The bottom end cap includes projections extending upwardly into channels of the edge column. The bottom end cap may also include a base plate which supports a bottom quoin panel thereon.

Quoin connecting members interconnect each quoin panel to the edge column. The quoin connecting members typically have a generally "C" cross-sectional configuration. A first end of the quoin connecting member is attached to a groove formed in the edge member. A second end of the quoin connecting member is attached to a bracket integrally formed with or attached to an inner surface of the quoin panel. The second end of the quoin connecting member may include a barb that snap fits into a receiving portion of the quoin panel bracket. The first end of the quoin connecting member is slidingly received within the groove of the edge member.

A top end cap is disposed at the top end of the edge column. A concealing spacer may be disposed below the top end cap and slidably moveable relative to the top end cap and the edge column to conceal the edge column during expansion and contraction of the quoin system. The concealing spacer may be biased into a downward position by springs.

The quoin panels may be illuminated, such as by disposing a lighting array relative to an inner surface of the stack of quoin panels. The lighting array may comprise an LED array associated with an elongated slot of the edge column to direct light to the quoins. Additionally, or alternatively, the lighting array may be comprised of a plurality of LED arrays extending along the length of the edge column to illuminate the stack of quoin panels.

A transparent panel may be disposed between the quoin and the edge column. A gasket may be disposed between the quoin panel and the transparent panel to prevent moisture intrusion.

The quoins may be comprised of plastic pellets of varying color and/or transparency. The quoins may be comprised of melted and partially melted pellets to facilitate a desired illumination effect of the quoins.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a prefabricated decorative quoin installation system, generally referred to by the reference number 100, and a method for assembling and installing the same onto a structure, such as a building 10. The decorative quoin installation system of the present invention adds curb appeal and value to a building 10, such as a home, by making it look more appealing. Traditionally, quoins were reserved mostly for brick and rock buildings and created during the manufacture of these buildings. However, the prefabricated decorative quoin installation system 100 of the present invention can be installed over any finish, including stucco, wood, brick, or rock of existing buildings.

Figure 1:
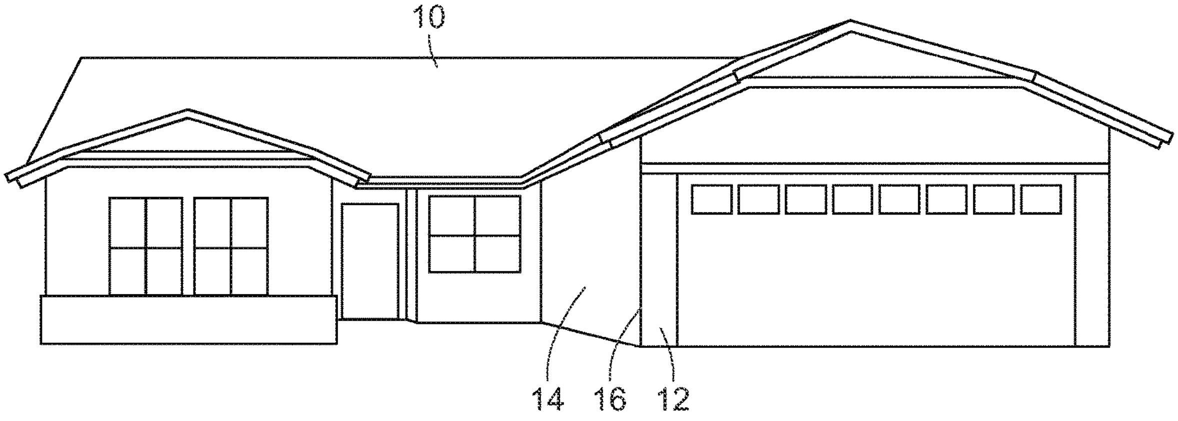
FIG. 1 is a perspective view of a residential home before the decorative quoin system of the present invention is installed.
Figure 2:
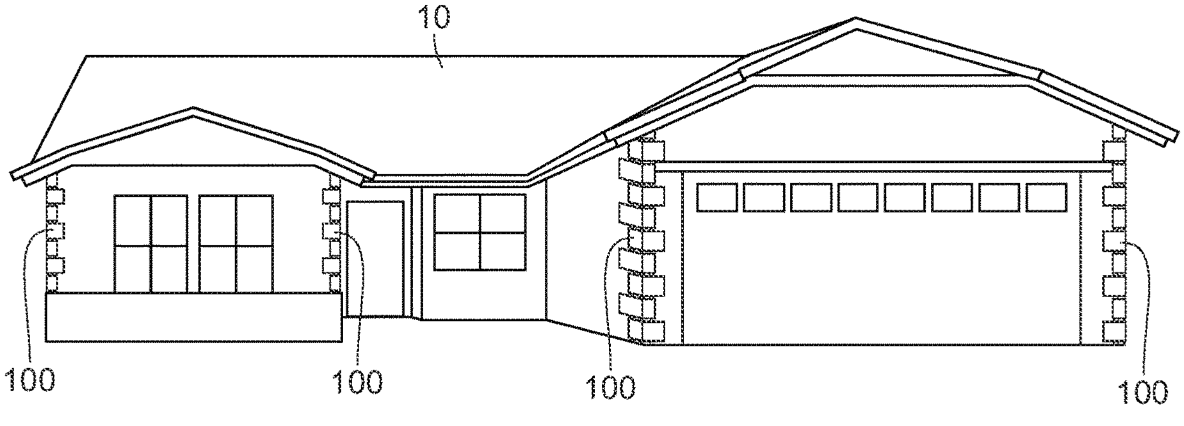
FIG. 2 is a perspective view of the home of FIG. 1 now with exemplary prefabricated quoin systems installed, in accordance with the present invention.

With reference now to FIGS. 1 and 2, a building 10, in the form of a residential house, is shown in FIG. 1. Exterior walls 12 and 14 which are adjacent to one another or intersect with one another form corners 16. FIG. 2 illustrates the decorative quoin system 100 installed on various corners of the building, including edges of the garage door structure and also the edges or corners of a far-side window structure of the building 10. Depending upon the size of the building or the portion of the building, quoins of varying sizes may be used. For example, quoins used around a garage door opening of a residential house may use a shorter quoin. The use of quoins gives the building a richer and more custom look.

Figure 3:
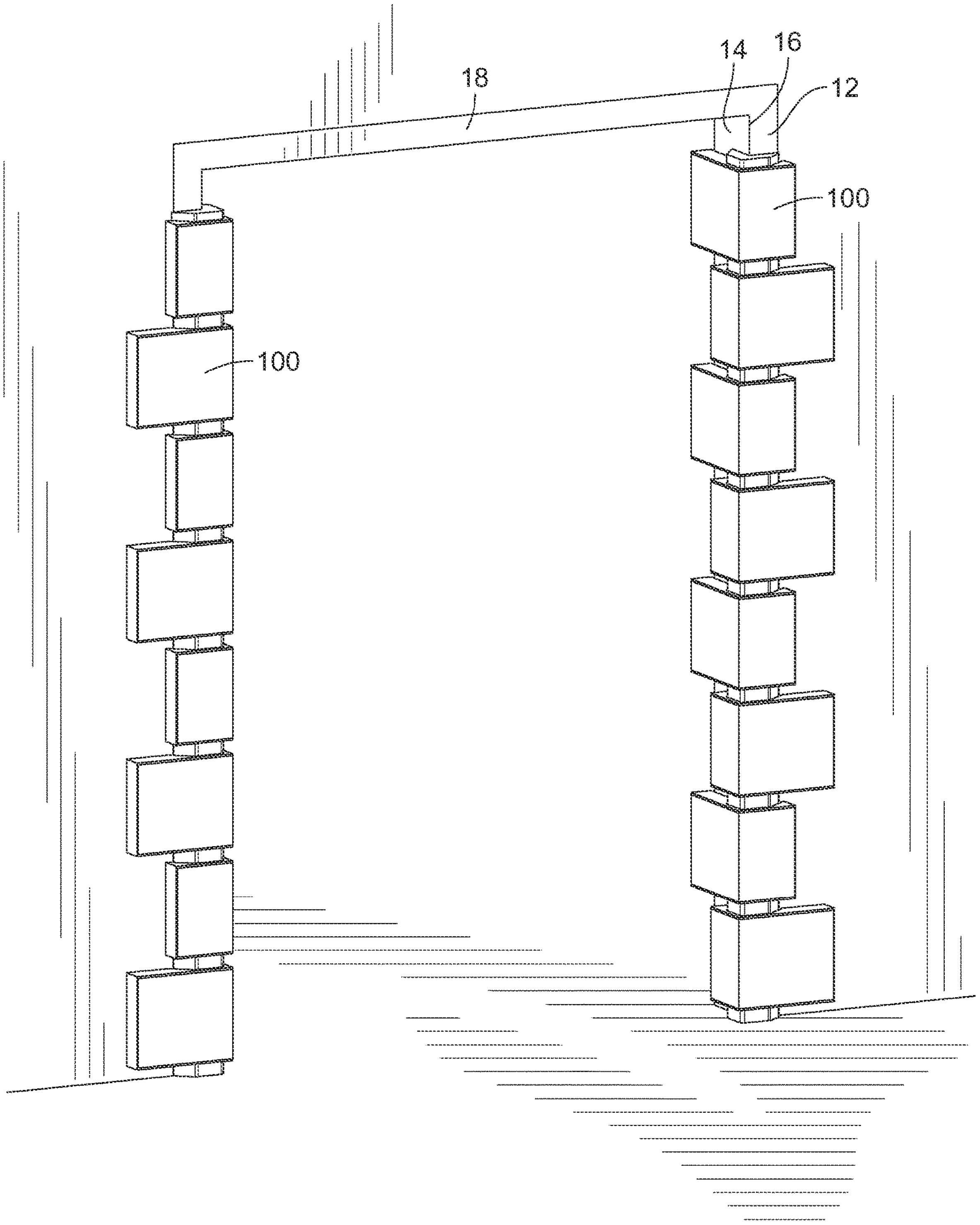
FIG. 3 is a perspective view of an exemplary prefabricated decorative quoin system installed inside a doorway.

With reference now to FIG. 3, the present invention can be used not only to enhance the exterior of a building 10, but also the interior of a structure. In this case, the prefabricated decorative quoin system 100 is shown installed on opposite sides of a doorway 18, wherein adjacent walls or door jams 12 and 14 form a corner 16 to which the system 100 of the present invention is attached for decorative and aesthetic purposes.

In the past, a purchase of a new garage door was routinely done to enhance the perceived value of one's home. Various landscaping improvements could also increase the perceived value. Now, the structure and perceived value and appearance of the house, or other building structure, can also be enhanced with the quoin installation system 100 of the present invention. The quoin installation system 100 of the present invention can be installed without experienced masonry skills or the associated costs. The components are manufactured and designed so as to be maintenance free and dent and weather resistant. The system 100 has unlimited design and finish possibilities. Moreover, the system 100 of the present invention is nearly a toolless installation.

Figure 4:
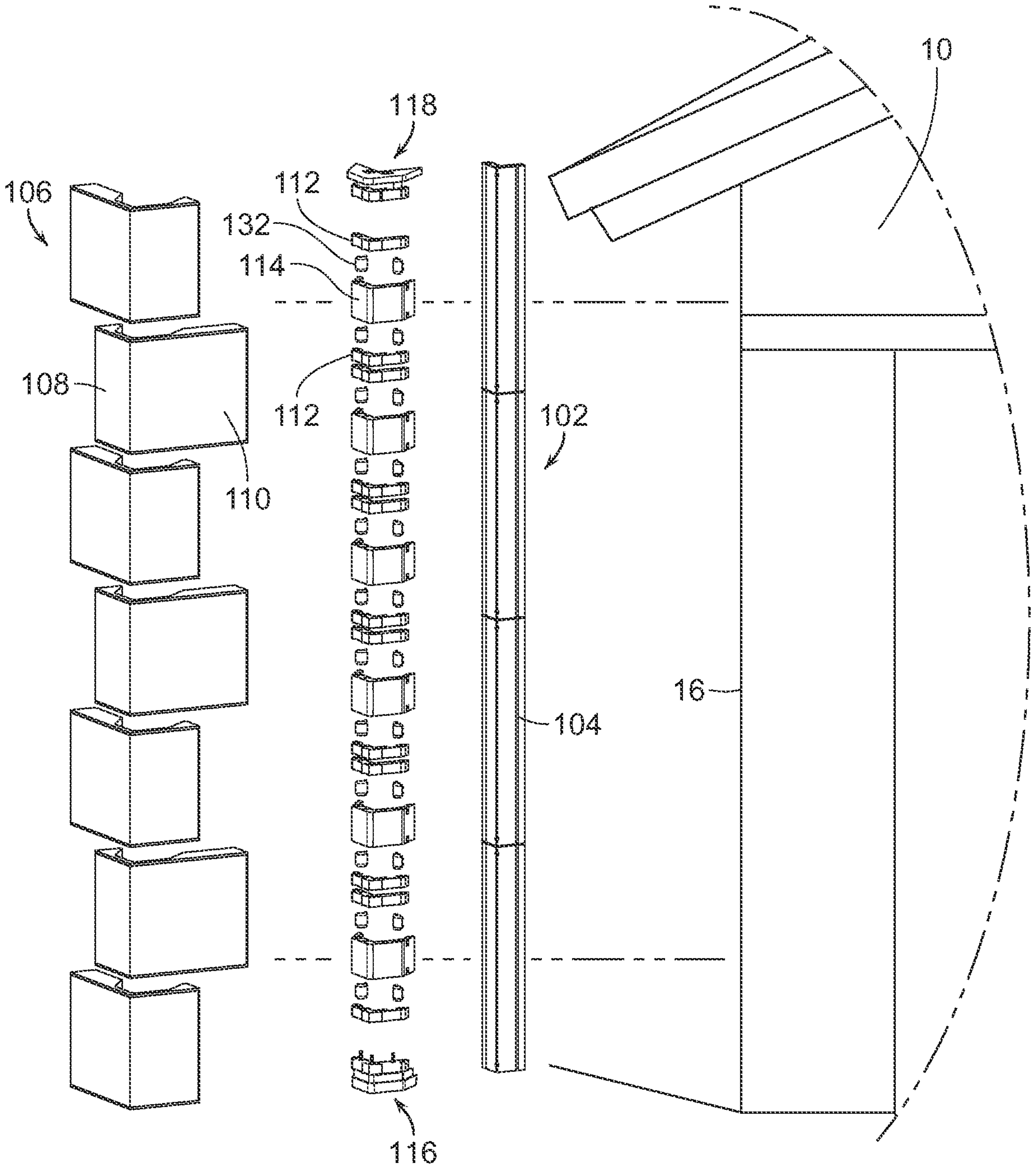
FIG. 4 is a partially exploded perspective view illustrating a decorative quoin system exploded away from an existing wall corner.

With reference now to FIG. 4, an exploded perspective view of various components of the system 100 of the present invention is shown prior to full assembly and installation to the corner 16 of the structure 10. The system includes an edge column 102, which is preferably comprised of a plurality of interconnected elongated edge members 104. The edge members are of a preset length, such as being either one or two feet in length, so that a predetermined number of the edge members can be interconnected to one another to have a total combined length corresponding to a length of an existing wall quarter 16 to which the edge column 102 is to be attached. The edge column 102 serves as an anchor for other components of the system 100. Preferably, the edge members 104 comprising the edge column 102 are comprised of a sufficiently durable and weather resistant material which is capable of both being attached to the corner 16 of the structure 10 as well as supporting the other components of the system 100. In a particularly preferred embodiment, the edge members 104 are comprised of an aluminum extrusion which may have a weather-resistant material coated thereon. Such a coated aluminum construction is both weather resistant and has longevity and sufficient strength. Moreover, using the edge members 104 of preset lengths removes any requirement to cut the edge column 102 to a required length. Instead, merely a given number of edge members 104 merely need be connected end-to-end to form the vertical edge column 102 having a sufficient length, corresponding to the length of the corner 16 of the structure to which it is to be applied. The edge members 104, and thus the resulting edge column 102 is generally angular, such as forming a right angle, so that it can be placed over the right angle of the existing corner 16 formed by adjacent walls 12 and 14.

The system 100 also includes a plurality of quoin panels 106 which are attached to the edge column 102 in vertical stacked relation. The quoin panels 106 are comprised of a sufficiently durable and weather resistant material. This may be a polypropylene or similar material, which is both dent and water resistant. This makes the quoin panels 106 essentially maintenance free. While the quoin panels 106 may be painted, more typically, the quoin panels are formed, such as by molding or the like, of a plastic or polypropylene material having the desired color and not painted. The exterior of the quoin panels 106 are also angular, typically forming a right angle substantially matching or mimicking the corner 16. A first exterior face 108 of the quoin panel is of a smaller length or dimension than a second face 110, typically, in order to give a desired offsetting appearance when the quoin panels 106 are stacked upon one another. An interior surface of the quoin panels 106 are configured to be placed over the edge column 102 and be connected thereto as well as to any other system components. Typically the interior surface is generally angular, such as forming a generally right angle.

An interior surface of the quoin panels 106 may be configured, such as having a bracket integrally formed therewith, for connection to the edge column 102. Preferably, however, brackets 112, typically two per quoin panel 106, are attached to the inner surface of the quoin panel 106 and have the desired geometry for interconnection with the edge column 102. The quoin panels 106 may be molded and manufactured so as to have threaded inserts installed at the time of manufacture to fasten the brackets 112 onto the interior surface of the quoin panel 106. An advantage of using and fastening separate brackets 112 to the quoin panels 106 is that the brackets may be comprised of a different material, such as nylon or the like, which is more shrink and expansion resistant than the quoin panel material and also functions to be dimensionally stable in the attachment to the edge column 102. Screws may be threaded through receiving apertures of the brackets 112 and into the quoin panel 106, such as the aforementioned threaded inserts.

While the quoin panels 106 may be directly stacked upon one another, in a particularly preferred embodiment, spacer panels 114 are disposed between adjacent quoin panels 106. The spacer panels 114 are also generally angular in shape, such as having a generally right angle at an exterior surface thereof. The spacer panels may be comprised of a nylon or similar material and may be painted a similar color as the walls 12 and 14 of the building to which the system 100 is attached to give a desired aesthetic appearance. The spacer panels 114 also conceal the edge column 102 and provide spacing, typically uniform spacing, between the quoin panels 106. Typically, there is a spacer panel 114 disposed between adjacent quoin panels 106.

Figure 5:
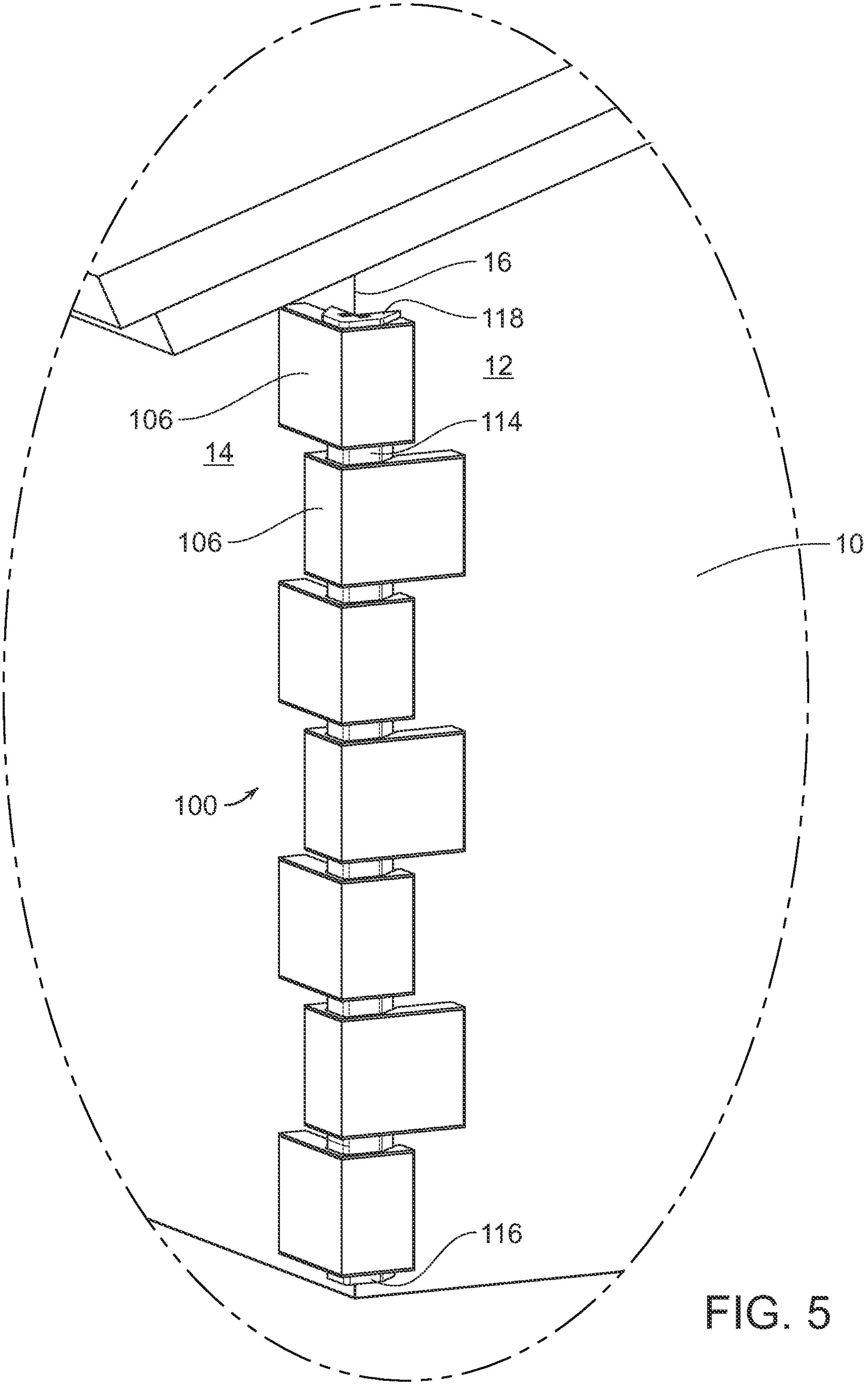
FIG. 5 is a perspective view similar to FIG. 4, but illustrating the decorative quoin system installed onto the wall corner.

The system 100 also includes a bottom end cap 116, disposed and connected to the bottom of the edge column 102, and supporting the bottommost quoin panel 106, and a top end cap 118 connected to a top of the edge column 102 to finish the assembly of the system 100. This finished assembly is illustrated in FIG. 5, showing the fully assembled system 100 attached to and installed upon the corner 16 of the building 10.

Figure 6:
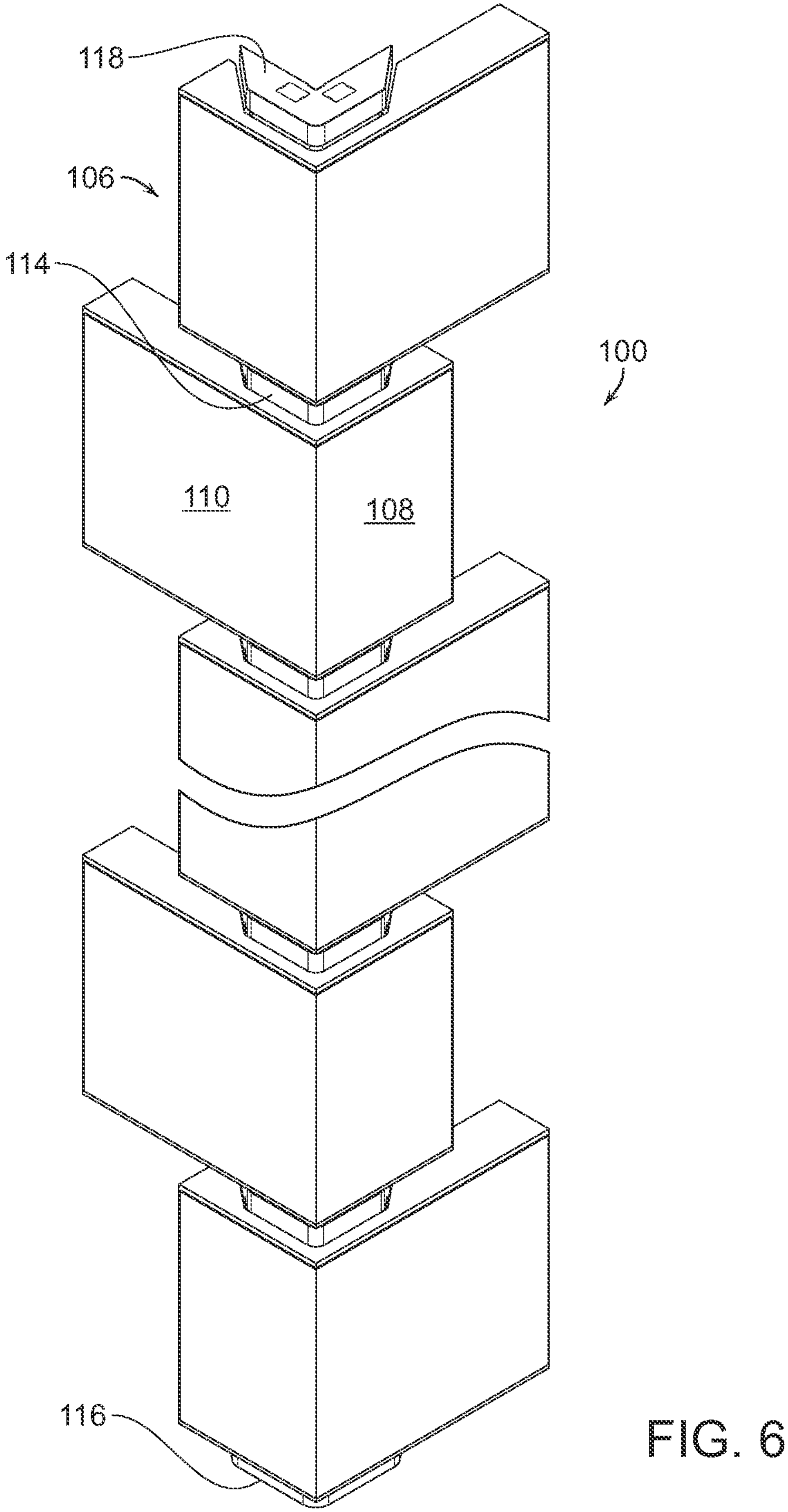
FIG. 6 is a front perspective view of an assembled decorative quoin system embodying the present invention.
Figure 7:
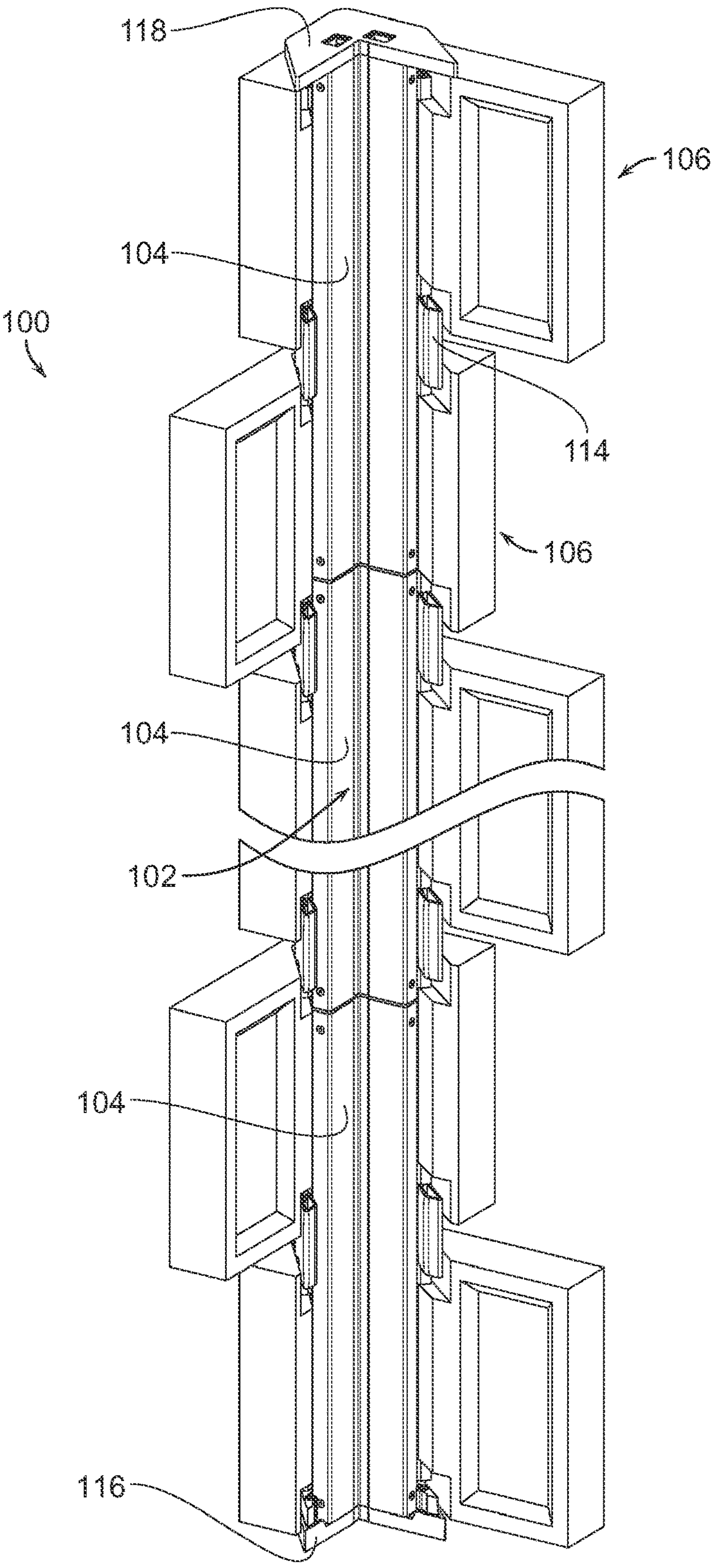
FIG. 7 is a rear perspective view of the decorative quoin system of FIG. 6.

With reference to FIG. 6, an exterior or front view of the assembled system 100 is shown. FIG. 7 is a rear or interior view of the system 100 of FIG. 6. It will be noted that the edge column 102, comprised of the plurality of edge members 104, cannot be viewed from the exterior of the assembled system, as illustrated in FIG. 6. This is desired for aesthetic purposes.

Figure 8:
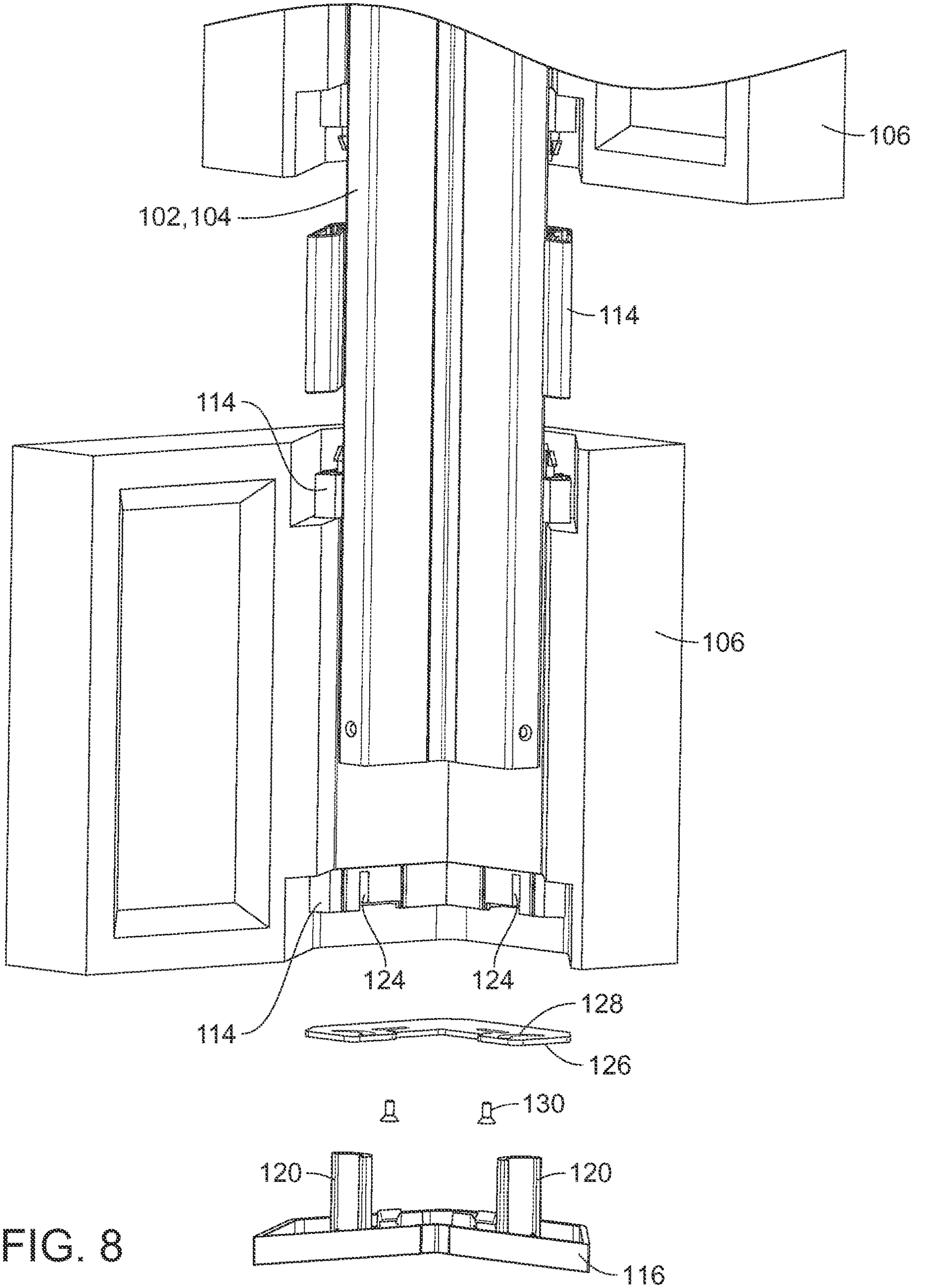
FIG. 8 is a partially fragmented and exploded perspective view of attachment of a bottom quoin panel and edge column attachable to a bottom end cap.

With reference now to FIG. 8, a partially exploded bottom portion of the assembly 100 is shown. The bottom end cap 116 is attached to a bottom portion of the bottommost edge member 104 of the edge column 102. The bottom end cap 116 includes projections 120 which extend upwardly into grooves 122 formed in the edge member extrusion. As illustrated, the protrusions 120 may be generally C-shaped in cross-sectional configuration and inserted within a corresponding curved or partial C-shaped groove 122. Each of the edge members 104 includes such a groove 122 extending the length thereof, such that the edge column 102 typically has these grooves 122 in alignment with one another. The projections 120 typically extend into both the grooves 122 of the edge member as well as into corresponding curve or C-shaped slot 124 or groove of a receiving portion of the quoin panel bracket 112. Typically, a base plate 126, which may be comprised of a metallic or other rigid and sturdy material, is associated with the bottom end cap 116, such as having apertures 128 inserted over projections 120. Fasteners 130 may be used to interconnect the bottom end cap 116, base plate 126, and the bottom of edge column 102 together.

With the bottom end cap 116 and base plate 126 attached to the bottom of the edge column 102, the bottommost quoin panel 106 may be slidably inserted over the base plate 126, so as to rest thereon, thus having a portion of the projection 120 inserted within slots 124. Thus, the quoin panel 106 is installed without the need of any tools. Moreover, preferably, the projections 120 do not have any locking tabs or the like, such that the bottommost or first quoin may be easily removed during construction in the event that this starter quoin 106 was installed incorrectly. The quoin panel 106 is then attached to the edge column 102 via quoin connecting members 132 interconnecting the edge column 102 with the bracket 112, as will be more fully discussed herein.

Figure 9:
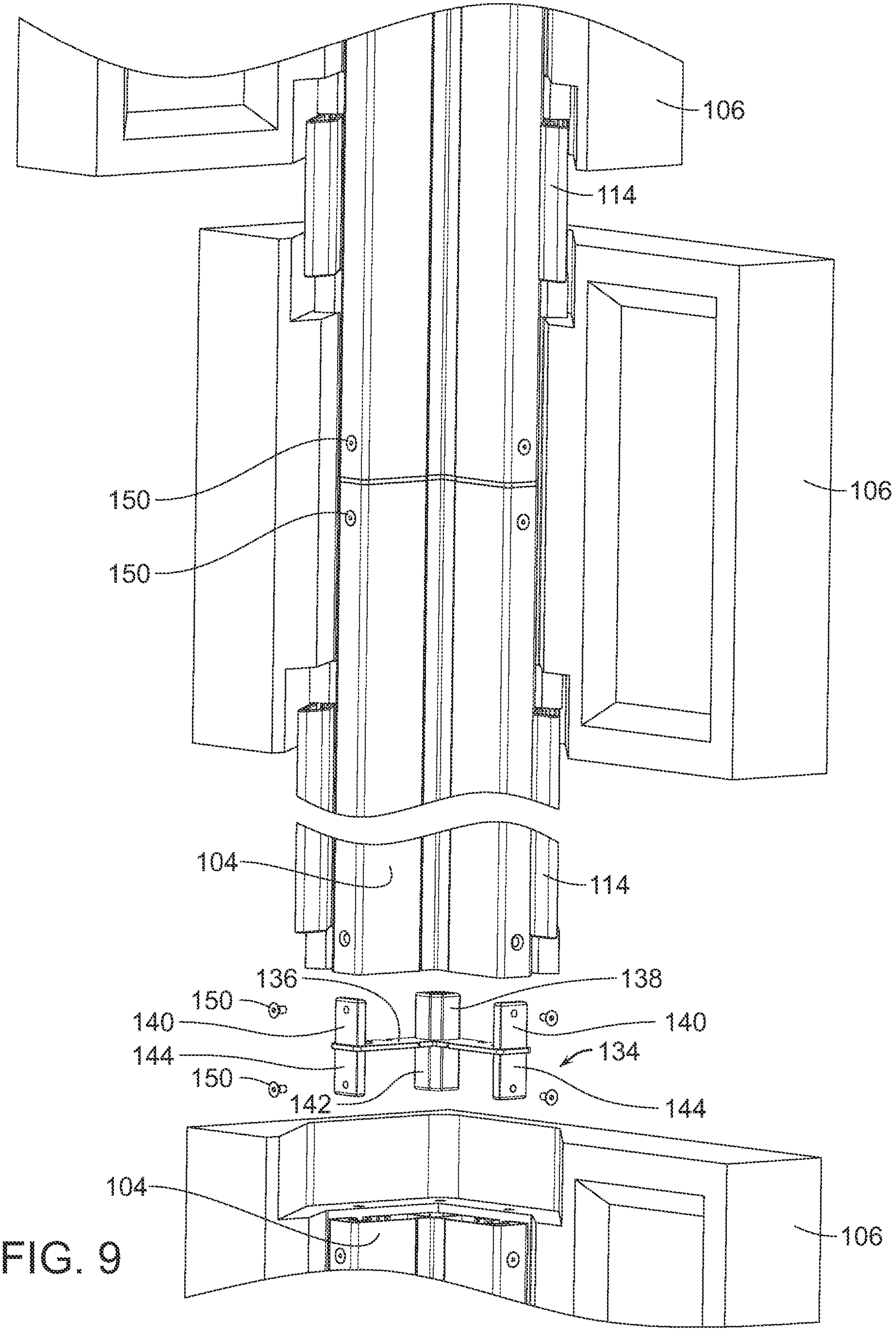
FIG. 9 is a partially exploded and fragmented view of an edge column, quoins and spacers used in the system of the present invention.
Figure 11:
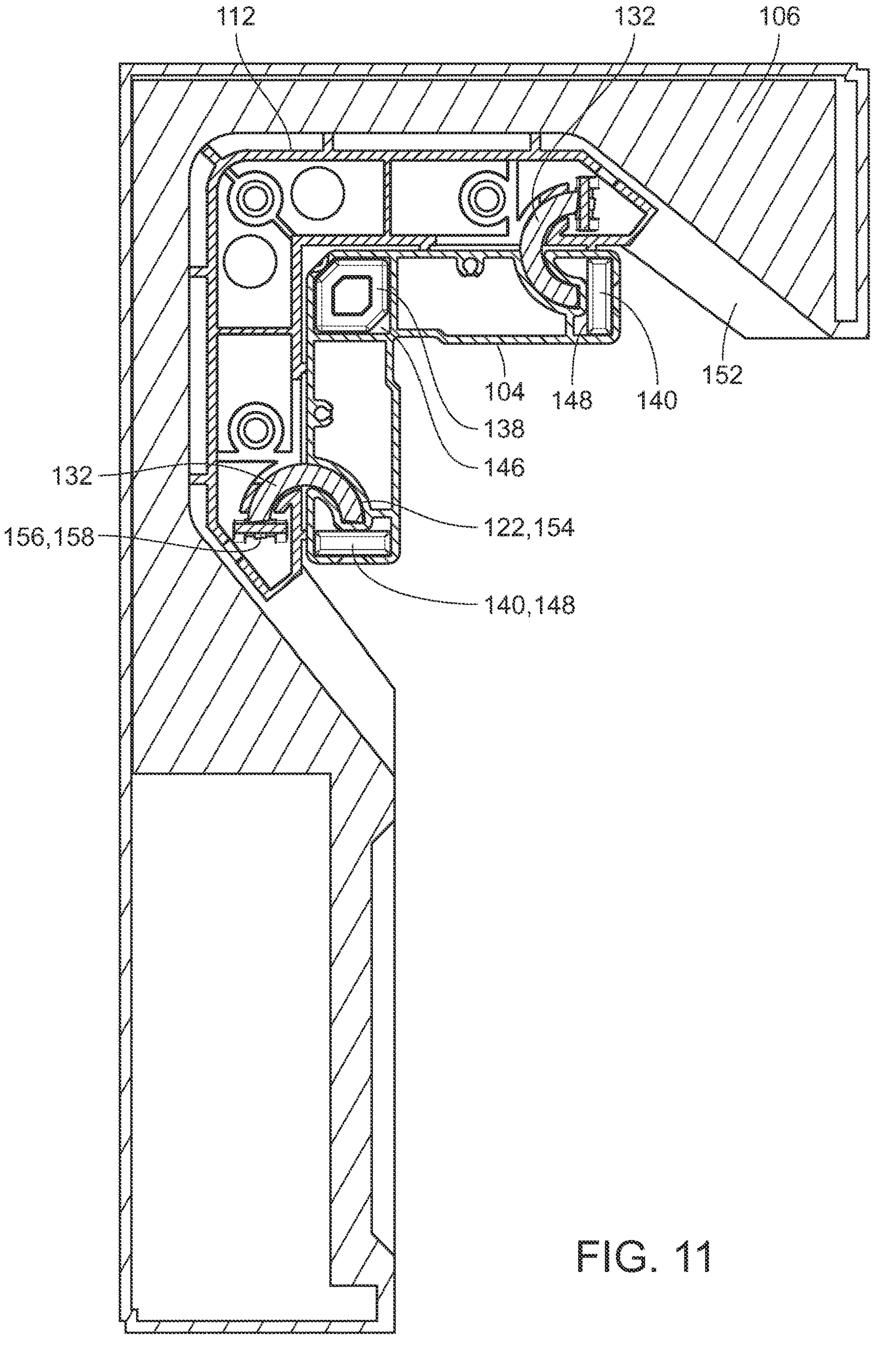
FIG. 11 is a cross-sectional view taken generally along line 11-11 of FIG. 10.

With reference to FIG. 9, another partially exploded and fragmented perspective view of various components of the system 100 of the present invention is shown. Typically, in order to interconnect extruded edge members 104, an edge connecting member 134 is disposed between ends of adjacent edge members 104, as illustrated. The edge connecting members 134, in a particularly preferred embodiment, as illustrated, comprises a plate 136 that has a first set of projections 138 and 140 extending upwardly therefrom and into corresponding channels 146 and 148 of the edge member 104, as illustrated in FIG. 11. Similarly, downwardly extending projections 142 and 144 extend into similarly configured channels at the upper end of the edge member 104 disposed below the edge connecting member. For a secure fit and attachment, fasteners 150 may be inserted through aligned apertures of the edge members 104 and the edge connecting member 134 so as to hold the edge connecting member 134 in place and interconnect the adjacent end-to-end edge members 104. In this manner, a plurality of edge members 104 are interconnected to one another, end-to-end, to create an edge column 102 of a desired length.

Preferably, as mentioned above, the edge members 104 are of a preset length. This may be, for example, one or two feet in length. Thus, if a portion of a wall or corner to have the system 100 of the present invention to be applied thereto is over seven feet in length, then a plurality of edge members 104 corresponding to approximately seven feet in length may be assembled to one another, such as three two-foot edge members and one one-foot edge member to create an assembled quoin assembly 100 of seven feet in length so that there will be additional length of the wall and corner above and below the installed quoin system. In this manner, cutting the edge members is unnecessary. Moreover, the edge column 102 can be created using only a hex driver or a screwdriver to attach the fasteners 150.

Figure 10:
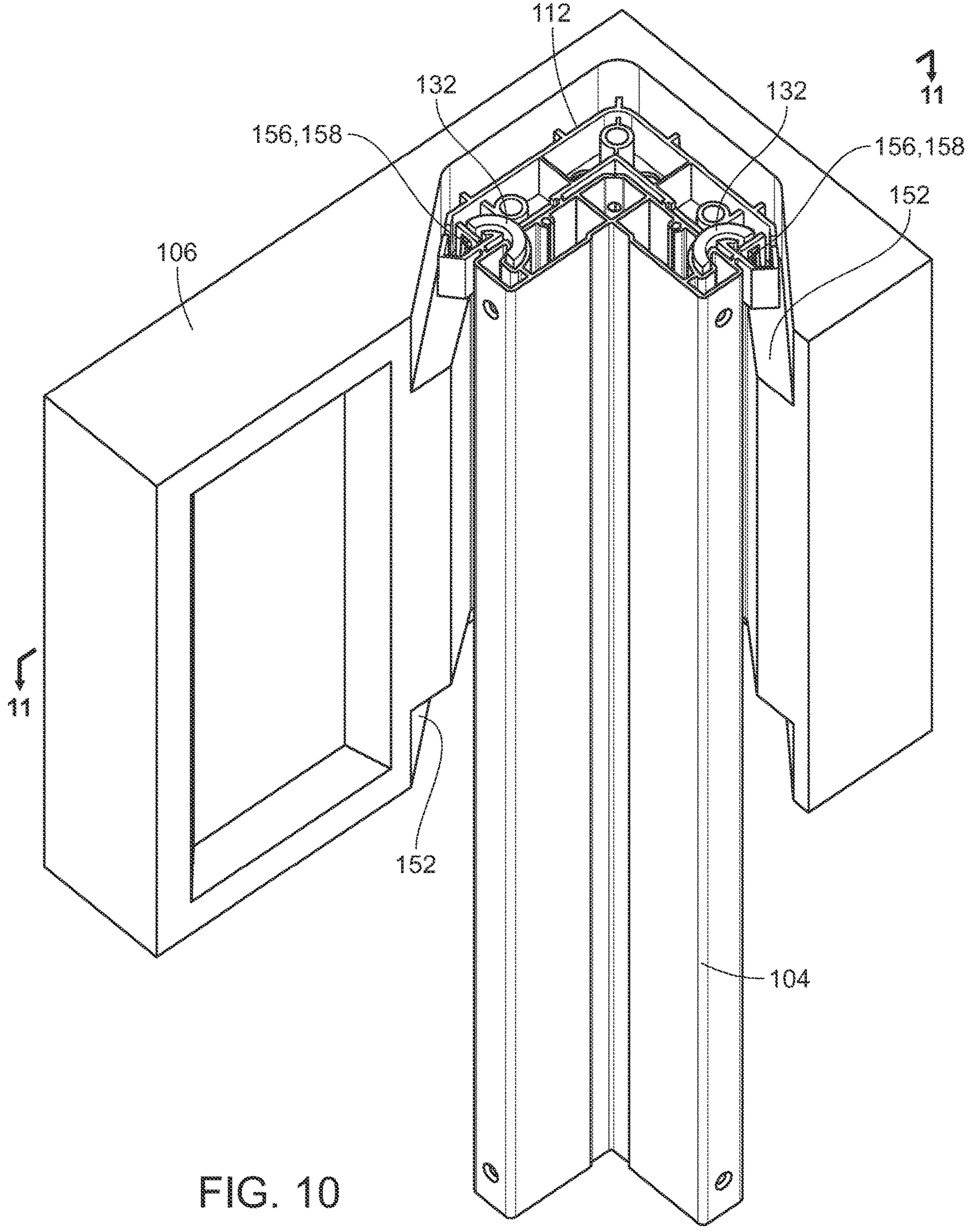
FIG. 10 is a top perspective view illustrating the interconnection of a quoin panel to an edge column of the system of the present invention.

With reference now to FIGS. 10 and 11, as mentioned above, the quoin panels 106 are connected and assembled onto the edge column 102. This is preferably done without tools. The inner surface of the quoin 106 has a desired geometry, or more typically, bracket 112 is attached to an inner surface of the quoin 106, typically within a recessed area 152 at the top and bottom of the quoin 106, as illustrated in FIG. 10. As mentioned above, the edge members 104 have formed therein, such as during the extrusion process, open-faced grooves 122 which receive a portion of the quoin connecting member 132 therein. The bracket 112 has corresponding slots 124 which receive the other portion of the quoin connecting member 132 therein. A first non-locking end 154 of the quoin connector 132 is inserted into the edge member groove 122, so as to slide therein. However, a second end of the quoin connecting member 132 has one or more locking tabs 156 which engages with a receiver 158 of the bracket 112 when the quoin connecting member 132 is pushed therein, so as to form a snap-fit connection. Preferably, as illustrated, the quoin connecting members have a generally C-configuration, such as having a C-shaped cross-sectional configuration. In this manner, approximately half of the curvature of the quoin connecting member 132 is inserted within the edge member groove 122, and the other half of the quoin connecting member 132 is inserted and locked into the bracket 112. Thus, the bracket 112, and its attached quoin panel 106 are slidable with respect to the edge column 102.

Figure 12:
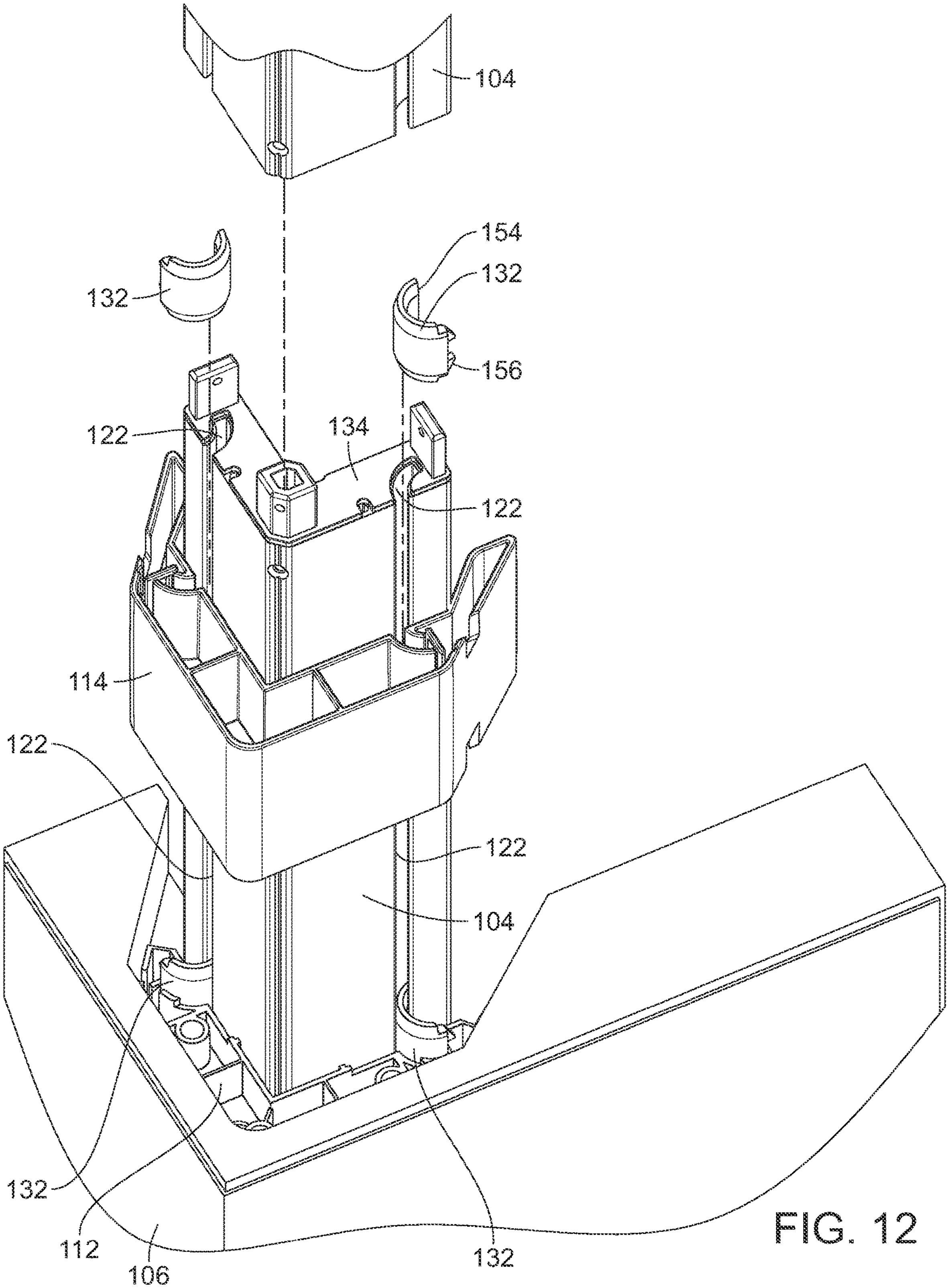
FIG. 12 is a partially exploded and perspective view illustrating the attachment of a spacer to an edge column, in accordance with the present invention.
Figure 13:
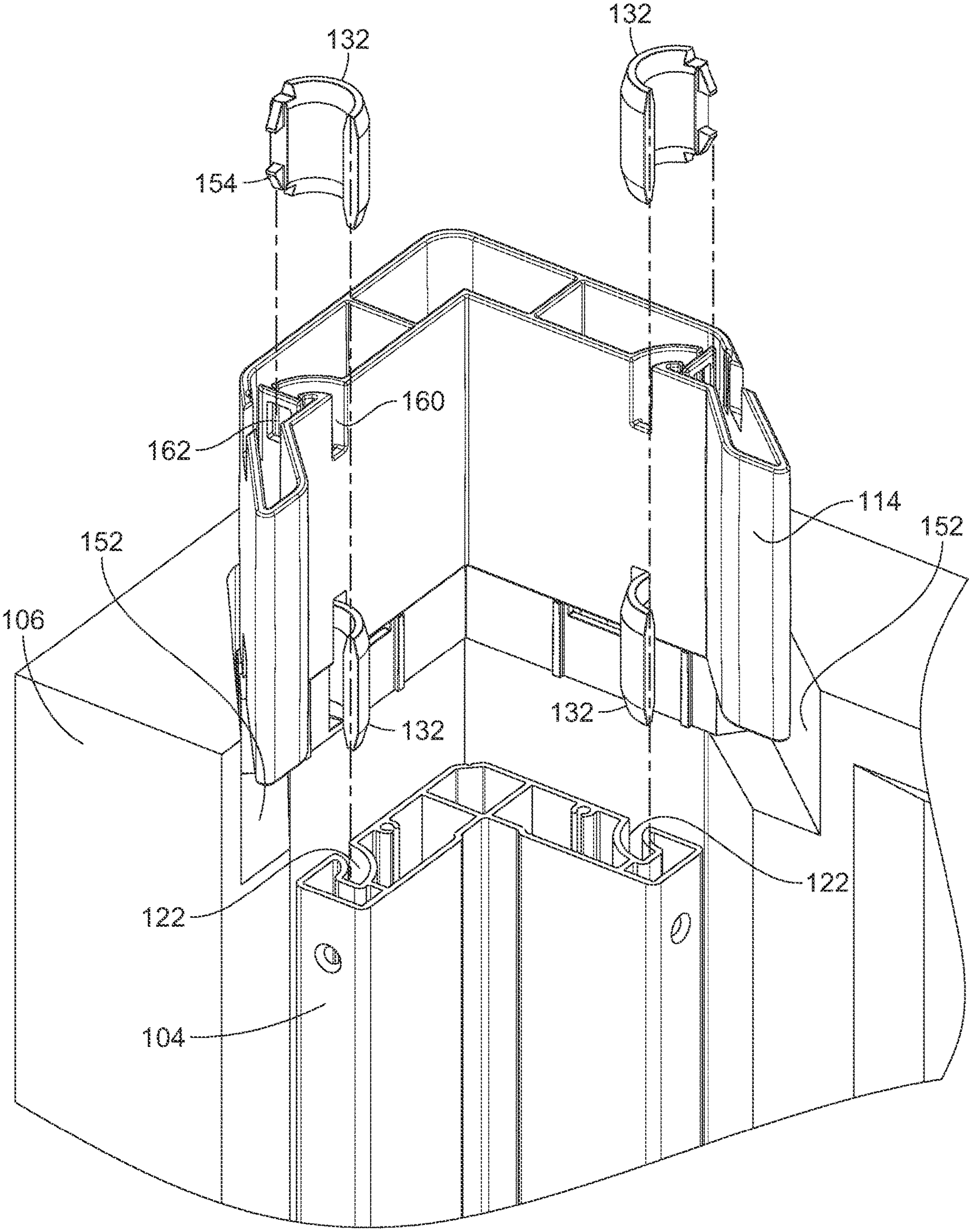
FIG. 13 is a view similar to FIG. 12, but from the rear.

With reference now to FIGS. 12 and 13, a similar interconnection methodology is used for interconnecting the spacer panels 114 to the edge column 102 and disposing them between adjacent quoin panels 106. More particularly, quoin connecting members 132 have a non-locking first end thereof 154 inserted into groove 122 of the edge member 104, and the opposite end having the locking tabs 156 is inserted into a corresponding slot 160 of the spacer panel 114 such that the one or more locking tabs 154 are snap-fit into a receiver portion 162 of the spacer panel 114. Typically, as illustrated in FIG. 13, at least an upper and lower portion of the spacer panel 114 resides within the recessed portions 152, formed at the upper and lower ends of upper and lower quoin panels 106 so that the edge column 102 is concealed and a continuous aesthetic appearance is provided to the assembled system 100.

Figure 14:
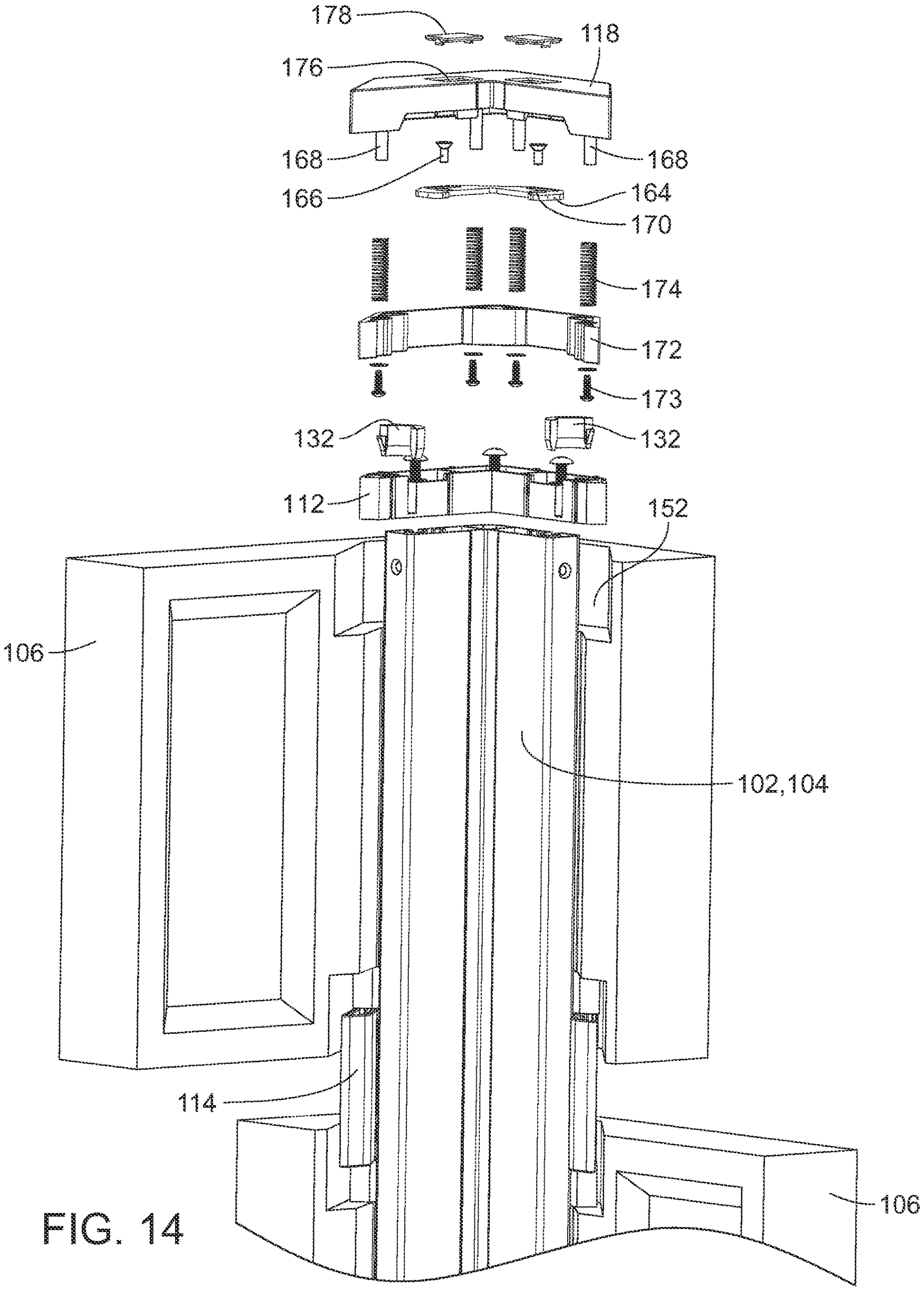
FIG. 14 is a partially exploded and perspective view illustrating a top end cap and concealer spacer attachable to the edge column, in accordance with the present invention.

With reference now to FIG. 14, an upper end of the system 100 is illustrated. Bracket 112 is used to interconnect the uppermost quoin 106 to the edge column 102, as described above. Quoin connecting members 132 interconnect the uppermost quoin panel 106 to the uppermost edge member 104 of the edge column 102. Typically, however, these quoin connecting members 132 are of a shorter dimension to prevent interference and enable placement and attachment of the top end cap 118 as well as other associated components.

With continuing reference to FIG. 14, a top end plate 164, typically constructed of a metal material such as steel, is attached, such as by fasteners 166 to the assembled quoin column, to lock the quoins in place. The top end plate 118 has projections 168 which may snap-fit into place in corresponding apertures 170 of the top end plate 164 so as to hold the top end plate 118 in place. Such projections 168 may also align with a spring loaded concealing spacer 172. The concealing spacer 172 includes fasteners 173 and is biased downwardly by springs 174. The concealing spacer 172 is movable between the bracket 112 and/or quoin 106 and an interior of the end cap 118, either due to expansion or contraction of the quoin system, such as due to temperature change, to conceal the uppermost portion of the edge column 102 from view. Thus, when the temperatures rise and the components of the system 100 expand, the concealing spacer 172 will be moved upwardly by the uppermost bracket 112 and/or quoin 106 against the bias of springs 174. However, when temperatures are lower and the system 100 contracts overall, the springs 174 will bias the concealing spacer 172 downwardly, so as to conceal the edge column 102. The concealing spacer 172 may be comprised of nylon, or other similar material and painted or constructed so as to have a similar color as the other spacer panels 114 as well as the bottom and top end caps 116 and 118, such as mimicking the color of the wall of the building 10, such that these are visually concealed and the viewer only sees the spaced apart quoin panels 106 from an exterior of the building or when viewing the assembled and installed system 100.

Apertures 176 are formed through the bottom and top end caps 116 and 118 so as to provide access to the fasteners therein. Caps 178 may be used to conceal these access openings 176. These end caps 178 may snap into place, and thus be installed in a toolless manner.

With reference now to FIGS. 15-18, the present invention also resides in a system and method for illuminating quoin panels, such as those illustrated and described above. Such illumination can provide an enhanced and interesting look to the building or other structure, particularly at night. Previously, such plastic parts comprising the quoin structure have remained unlit in their manufactured and finished state.

Figure 15:
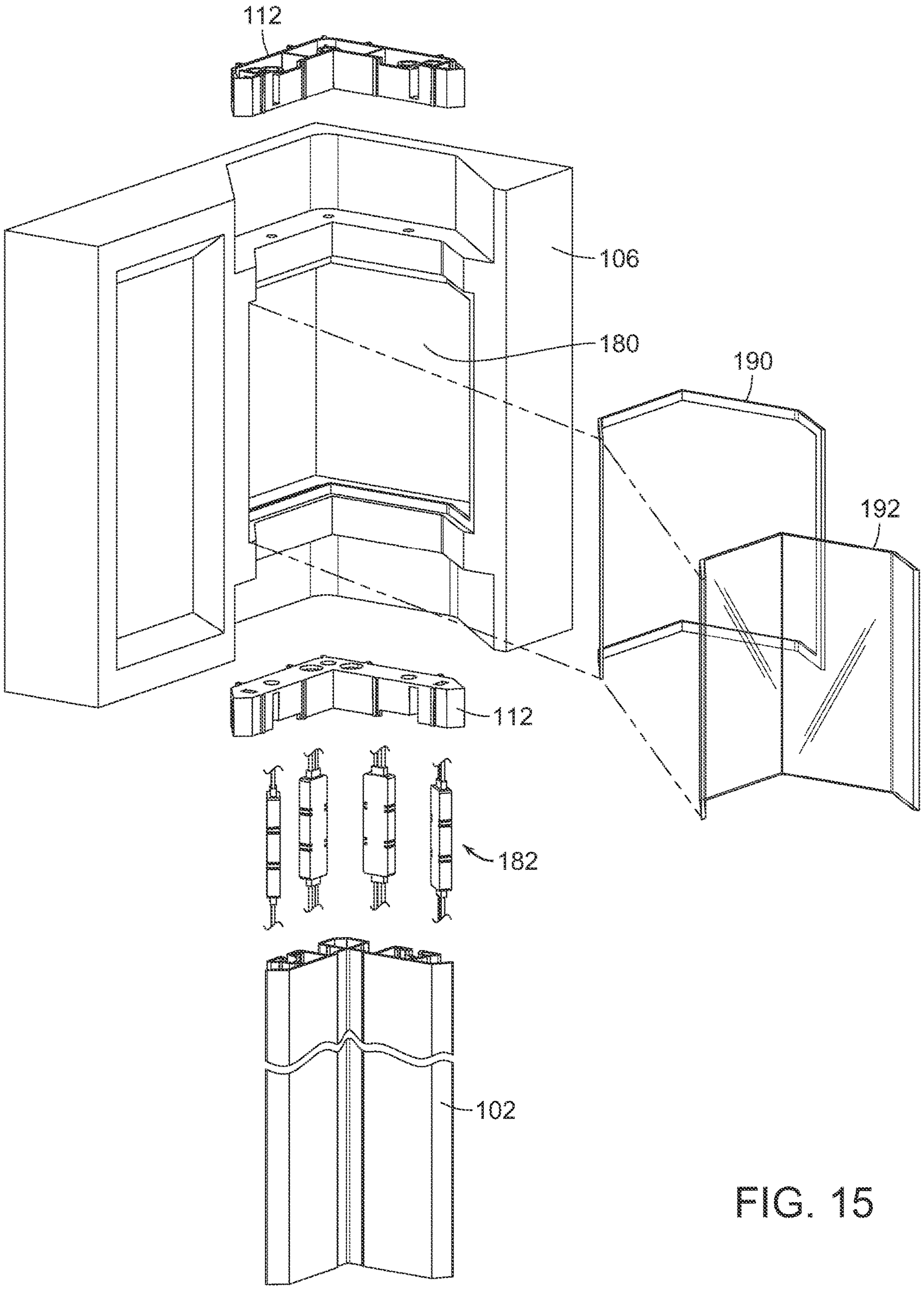
FIG. 15 is a partially exploded perspective view of the system of the present invention with illumination components.

With reference now to FIG. 15, a quoin panel 106 may be comprised of polypropylene or other plastic material and have a general configuration, as described above. Preferably, an interior area 180 of the quoin 106 is removed or created during molding so as to be relatively thin or of a single wall thickness, instead of being double walled. This will facilitate light being emitted from the quoin 106. A lighting array 182 may be disposed relative to the inner surface of the quoin 106, such as the recessed or single wall portion 180 so as to illuminate the quoin panel 106.

Figure 16:
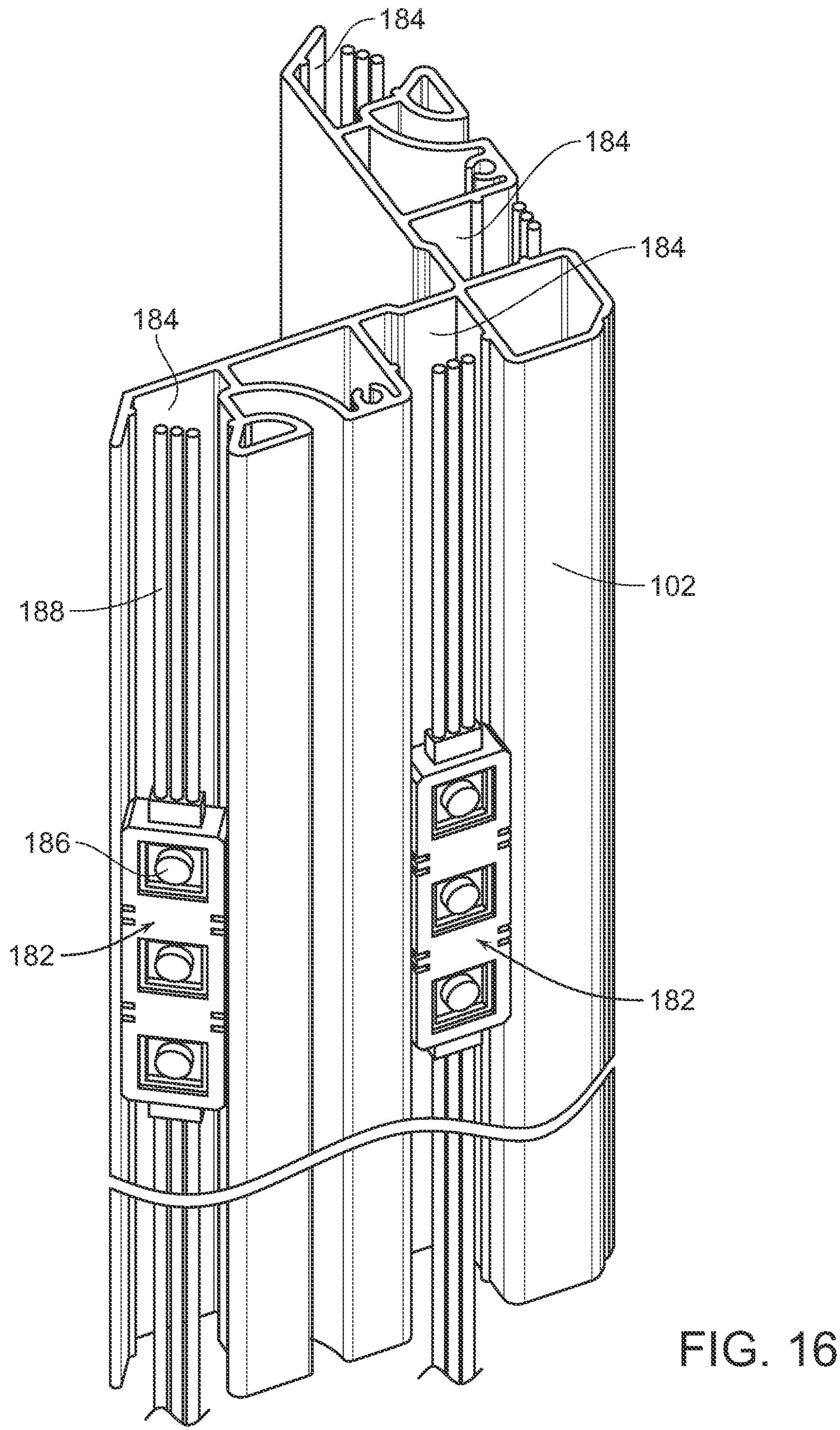
FIG. 16 is a fragmented perspective view of an edge column supporting a lighting array, in accordance with the present invention.

In a particularly preferred embodiment, the lighting array 182 comprises an LED array associated with a slot 184 of the edge column to direct light to the one or more quoin panels 106. More particularly, as illustrated in FIGS. 15 and 16, the lighting array may comprise a plurality of LED arrays extending along the length of the edge column, such as within the slots 184 formed on an exterior of the edge column 102, to illuminate the entire stack of quoin panels. As illustrated in FIG. 16, the lighting arrays comprise a plurality of LEDs 186 having electrical leads or wires 188, which will extend to a power and control source. Such power and control source may include a transformer, which transforms alternating current from the building or power source to an appropriate direct current source for use by the LEDs. The LEDs may be of a programmable color and pattern so that the user may be able to select, such as with a software application operated via a handheld device, such as a smartphone, the desired color of the LEDs, or even a sequence of color changes or flashing or the like, as desired. The power transformer and controller unit are typically disposed within the building or other structure 10, although such could be enclosed within a protective box outside.

As illustrated in FIG. 16, the extruded edge column 102 includes in this preferred illustrated embodiment four open-ended slots or channels 184, each of which may receive a lighting array therein, and which are directed outwardly towards the inner surface of the quoin panel 106, preferably aligned with the cutout portion 180 or the portion 180 which has been molded to have a single layer or more transmissible layer through the quoin panel 106. Preferably, the generated light travels through only one layer of plastic, although the invention is not limited to such.

A gasket 190 may be disposed and attached to the inner surface of the quoin panel 106 to prevent moisture intrusion. A transparent or translucent panel 192 may also be provided to protect the lighting arrays. Preferably, the panel 192 is configured so as to be attached to gasket 190 and reside within the cutout or recessed portion 180 of the quoin panel 106. The panel 192 is preferably of a translucent plastic material and having a configuration so as to be wrapped around the edge column 102 and lighting array 182.

Figure 17:
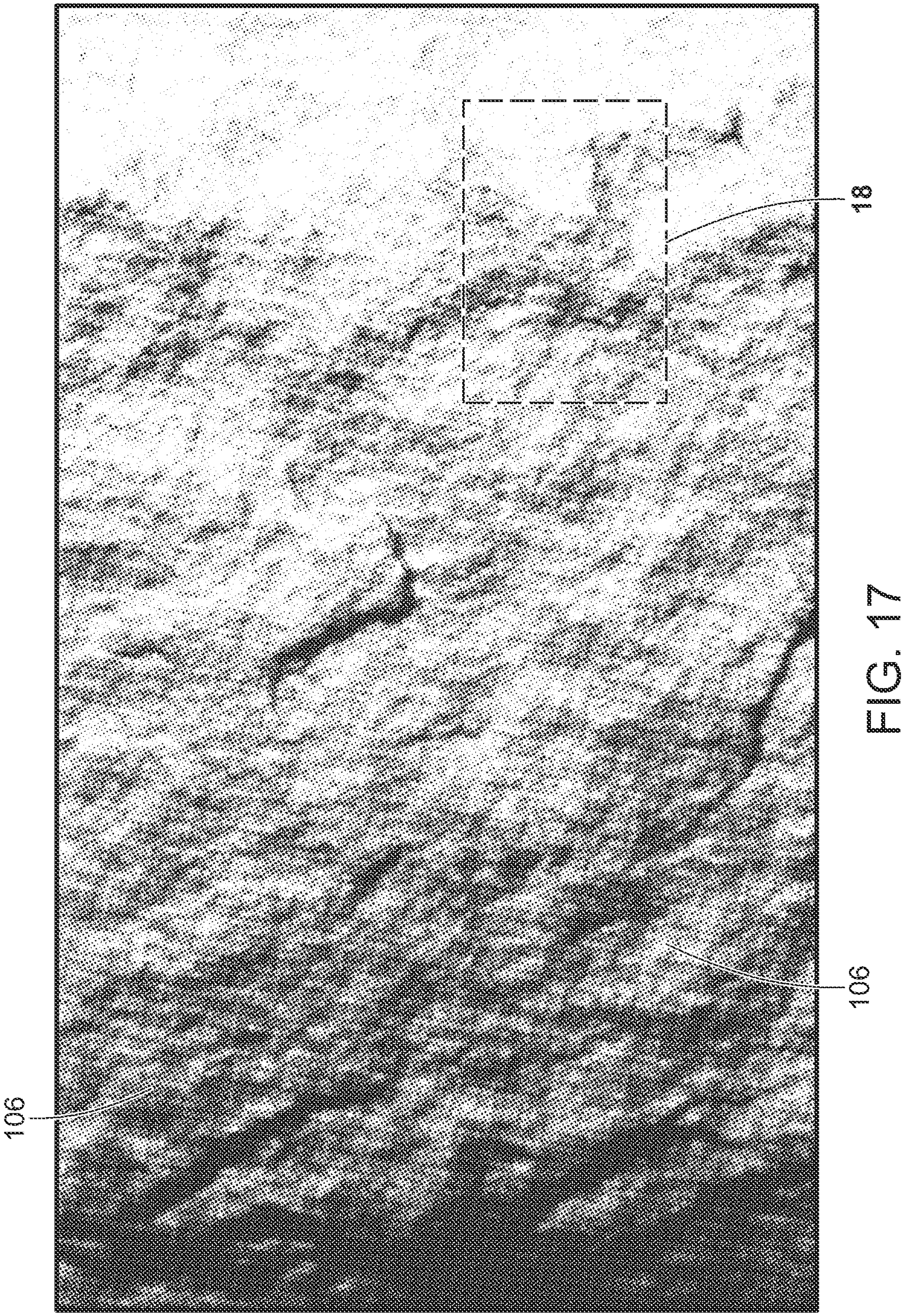
FIG. 17 is a photograph of a decorative quoin panel used in accordance with the present invention.
Figure 18:
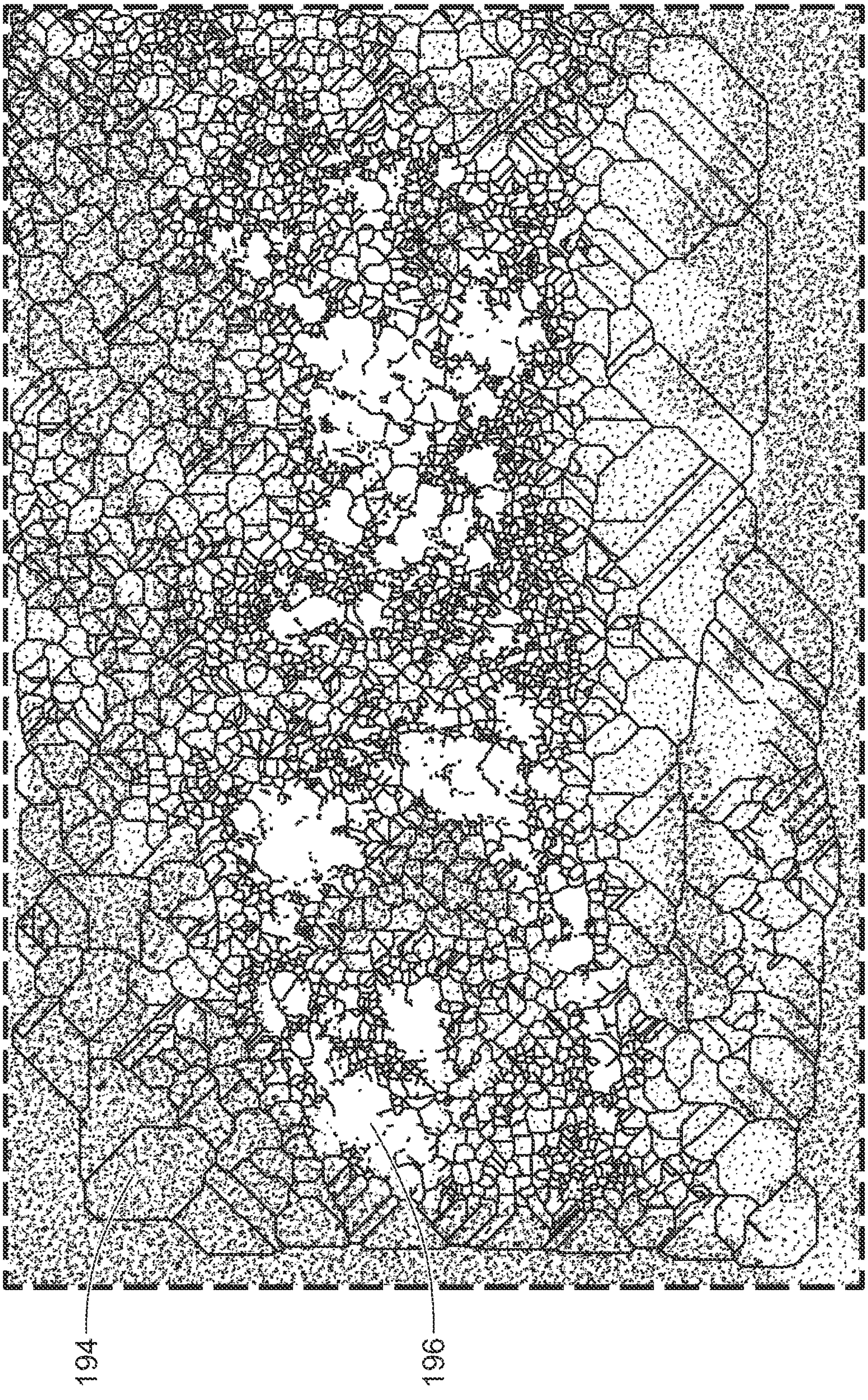
FIG. 18 is an enlarged diagrammatic view of area "18" of FIG. 18, illustrating pellets used in accordance with the construction of the quoin panel.

With reference now to FIGS. 17 and 18, a closeup photograph of an exterior surface of a quoin panel 106 is shown. Area "18" of FIG. 17 is diagrammatically illustrated in FIG. 18 to illustrate a manufacturing process of the quoin panel 106 so as to permit or enhance light passage therethrough and/or to provide a desired lighting effect. This is particularly useful with quoin panels which are of a darker color. The manufacturing process comprises adding a desired percentage of natural or clear plastic and/or translucent or transparent colorings in the form of pellets, liquid, or powders during the molding process for each dark colored quoin panel part 106.

With reference to FIG. 18, the pellet melt pattern of the formula and methodology used to create the illumination of the dark colored plastic quoin or other plastic part is shown. In this enlarged figure, reference number 194 refers to plastic pellets (or liquid or powder or the like) of a natural or darker color, or that which has been melted to a differing degree than the pellets 196 (which may also refer to liquids or powders) which are of a lighter color, translucent, or transparent, or which have also been melted to a differing degree, such as being partially melted. Thus, during the molding and manufacturing process a combination of pellets, liquid or powder (referred to herein generally as pellets) of varying color and/or transparency and/or combination of melted and partially melted plastic pellets are formed. Thus, the exterior of the quoin panel 106 during the daylight will have the desired natural or dark color. However, when illuminated, light will be able to be transmitted and passed through the transparent, translucent or partially or unmelted pellets 196 such that the quoin panels 106 are illuminated and light passes therethrough. Moreover, such a composition provides what can be referred to herein as a "galaxy-effect", wherein the quoin panel 106 is not uniformly illuminated, but has spaced apart small portions or even specks which are more fully illuminated than others. This can provide a desired aesthetic effect to the homeowner.

While the method described above has been developed to illuminate natural or darker colored quoin panels, it will be appreciated that the methodology of illuminating such items can be applied to other articles of manufacture utilizing the methodology of the present invention. For example, artificial rock, toys, indoor and outdoor décor, fencing, fence posts, end caps/cap stones, artificial cut stone, patio furniture, hot tubs, etc. comprised of polypropylene or other plastics may be illuminated by disposing a lighting array therein. The interior of such structures may be modified either by cutting areas of a double walled structure away to permit light to pass therethrough or during a molding process to create a single wall area or single wall unit which allows light to pass therethrough. Moreover, the methodology of creating a natural or dark colored molded product having the varying color or translucent or transparent pellets, which may be partially melted, fully melted, or not melted during the molding and manufacturing process can also be applied to such items to create the lighting effects described above.

Although several embodiments have been described in detail for purposes of illustration, various modifications may be made without departing from the scope and spirit of the invention. Accordingly, the invention is not to be limited, except as by the appended claims.

What is claimed is:

1. A prefabricated decorative quoin installation system, comprising;

- a plurality of elongated edge members each of a preset length, the plurality of edge members having a total combined length corresponding to a length of an existing wall corner;
- a plurality of edge connecting members, each edge connecting member disposed between adjacent ends of edge members to interconnect the plurality of edge members to form an edge column attachable to the existing wall corner, wherein each edge connecting member comprises a first set of projections extending into channels of an edge member disposed above the edge connecting member, and a second set of projections extending into channels of an edge member disposed below the edge connecting member; and
- a plurality of prefabricated quoin panels attached to the edge column in vertical stacked or horizontal row relation.

2. The system of claim 1, including a spacer panel disposed between adjacent quoin panels.

3. The system of claim 1, wherein the plurality of edge members are comprised of a weather resistant material or coating.

4. The system of claim 1, including a bottom end cap disposed at the bottom end of the edge column and stacked quoin panels.

5. The system of claim 4, wherein the bottom end cap includes projections extending upwardly into channels of the edge column.

6. The system of claim 4, wherein the bottom end cap includes a base plate which supports a bottom quoin panel thereon.

7. The system of claim 1, including quoin connecting members that interconnect each quoin panel to the edge column.

8. The system of claim 7, wherein a first end of the quoin connecting member is attached to a groove formed in the edge member and a second end of the quoin connecting member is attached to a bracket integrally formed with or attached to an inner surface of the quoin.

9. The system of claim 8, wherein the first end of the quoin connecting member is slidingly received within the groove of the edge member and the second end of the quoin connecting member includes a locking tab that snap fits into a receiving portion of the quoin panel bracket.

10. The system of claim 7, wherein the quoin connecting members have a generally "C" cross-sectional configuration.

11. The system of claim 1, including a top end cap disposed at the top end of the edge column.

12. The system of claim 11, including a concealing spacer disposed below the top end cap and slidably movable relative to the top end cap and the edge column to conceal the edge column during expansion and contraction of the quoin system.

13. The system of claim 12, wherein the concealing spacer is biased into a downward position by springs.

14. The system of claim 1, including a lighting array disposed relative to an inner surface of the stack of quoin panels to illuminate the quoin panels.

15. The system of claim 14, wherein the lighting array comprises an LED array associated with a slot of the edge column to direct light to the quoins.

16. The system of claim 14, wherein the lighting array comprises a plurality of LED arrays extending along a length of the edge column to illuminate the stack of quoin panels.

17. A prefabricated decorative quoin illumination system, comprising;

an elongated edge column attachable to an existing wall corner;

a plurality of transparent or translucent prefabricated quoin panels attached to the edge column in vertical stacked or horizontal row relation; and a lighting array disposed relative to an inner surface of the stack of quoin panels to illuminate the quoin panels, wherein exterior of the elongated edge column comprises at least four open-ended slots to receive a lighting array therein and are directed outwardly towards an inner surface of the quoin panels that have been molded to have one or more transmissible layer.

18. The system of claim 17, wherein the lighting array comprises an LED array associated with an elongated slot of the edge column to direct light to the quoins.

19. The system of claim 17, wherein the lighting array comprises a plurality of LED arrays extending along a length of the edge column to illuminate the stack of quoin panels.

20. The system of claim 17, including a transparent panel disposed between the plurality of quoin panels and the edge column.

21. The system of claim 20, including a gasket disposed between the plurality of quoin panels and the transparent panel to prevent moisture intrusion.

22. The system of claim 17, wherein the plurality of quoin panels is comprised of plastic pellets of varying color and/or transparency.

23. The system of claim 17, wherein the plurality of quoin panels is comprised of a combination of melted and partially melted plastic pellets.

24. The system of claim 17, including a spacer panel disposed between adjacent quoin panels.

25. The system of claim 17, wherein the edge column is comprised of a plurality of elongated edge members each of a preset length, the plurality of edge members having a total combined length corresponding to a length of the existing wall corner, and a plurality of edge connecting members, each edge connecting member disposed between adjacent ends of edge members to interconnect the plurality of edge members to form the edge column.

* * * * *